Patented Dec. 13, 1927.

1,652,748

UNITED STATES PATENT OFFICE.

ELMER B. VLIET, OF CHICAGO, AND ERNEST H. VOLWILER, OF HIGHLAND PARK, ILLINOIS, ASSIGNORS TO ABBOTT LABORATORIES, OF NORTH CHICAGO, ILLINOIS, A CORPORATION OF ILLINOIS.

3-AMINO-4-OMEGA-HYDROXYALKYLAMINOPHENYL ARSONIC ACIDS AND THEIR SALTS.

No Drawing. Application filed July 14, 1926. Serial No. 122,500.

Our invention relates to the production of the compounds above specified. These compounds are of especial value in the treatment of diseases produced by spirochetes and trypanosomes.

*General method.*

The first step in the general process for preparing compounds of this class consists in nitrating an omega-halogen alkyl-(p-arsonophenyl)-carbamate. For the preparation of this compound, see Rodewald and Adams; J. American Chemical Society, 45. p. 3103, Dec. 1923.

The following reaction occurs:

$$H_2O_3As-C_6H_4-NHCO(CH_2)_xY+HNO_3 = H_2O_3As-C_6H_3(NO_2)NHCO(CH_2)_xY+H_2O$$

where x=2 or more and Y=halogen.

The product of the above reaction is then treated with an alkali, whereupon the following reaction occurs:

$$H_2O_3As-C_6H_3(NO_2)NHCO(CH_2)_xY+3NaOH = \\ H_2O_3As-C_6H_3(NO_2)NH(CH_2)_xOH + NaCl+Na_2CO_3+H_2O$$

where x=2 or more and Y=halogen.

The second intermediate thus formed by the treatment with an alkali is then reduced, the reaction being as follows:

$$H_2O_3As-C_6H_3(NO_2)NH(CH_2)_xOH+6H = H_2O_3As-C_6H_3(NH_2)NH(CH_2)_xOH+2H_2O$$

where x=2 or more.

The desired acid thus formed may be converted into salts if desired, in the usual manner.

*Example I.—3 - amino - 4 - beta - hydroxyethyl-amino-phenyl-arsonic acid.*

We will first describe the preparation of the first intermediate β-chloroethyl-(4 arsono-2-nitro-phenyl) carbamate. 102 grams of beta-chloro-ethyl-(p-arsono phenyl) carbamate (Rodewald and Adams; J. Am. Chem. Soc., 45. p. 3103, Dec. 1923) is slowly added with constant stirring to 265 c. c. of concentrated sulfuric acid, keeping the temperature between 0 and 10° C. by cooling. When all is dissolved, a cold mixture of 20.4 c. c. of nitric acid (sp. gr. 1.42) and 26.5 c. c. of concentrated sulfuric acid is added drop by drop with stirring, keeping the temperature between 0 and 5° C. After all has been added, stirring is continued for ½ hour during which the temperature is allowed to increase to 15° C.

The reaction mixture is then added to a mixture of 1000 grams of ice and 450 c. c. water. A light colored solid separates. After standing for several hours, it is filtered, washed several times with water and dried. In order to purify it, the product is boiled with 95% alcohol in which it is insoluble but in which impurities are readily soluble. The product, beta-chloroethyl-(4-arsono-2-nitro-phenyl) carbamate is thus obtained in an almost quantitative yield.

We will now describe the preparation of the second intermediate.

3-nitro-4-beta-hydroxyethylamino-phenyl-arsonic acid is now prepared from the first intermediate by the following method. 140.5 grams of β-chloro-ethyl-(4-arsono-2-nitro-phenyl)-carbamate is dissolved in a solution of 75.6 grams of sodium hydroxide in 765 c. c. of water. The solution is refluxed gently for four hours. It is then filtered from any insoluble impurities while hot and concentrated hydrochloric acid is then added to the filtrate until the mixture is just acid to congo. A copious yellow precipitate of 3-nitro-4-beta-hydroxyethylamino-phenyl arsonic acid is obtained. After cooling thoroughly, the product is filtered off. It may be purified by crystallizing from hot water from which it separates in the form of beautiful yellow leaflets.

From the second intermediate we now prepare the desired acid by the following method:

100 grams of 3-nitro-4-beta-hydroxyethylamino-phenylarsonic acid is dissolved in 660 c. c. of normal sodium hydroxide solution and the solution is cooled to 0° C. Then 220 grams of powdered sodium hydrosulfite is quickly added with vigorous stirring. The solution warms up to 40° C. and is cooled to 25° C. as quickly as possible and is allowed to stand at that temperature for two hours. 50 c. c. of concentrated hydrochloric acid is then added whereupon a white precipitate separates. The mixture is cooled thoroughly and filtered. The product, 3-amino-4-beta-hydroxyethylaminophenylarsonic acid, may be purified by dissolving in sodium hydroxide solution, filtering and reprecipitating with glacial acetic acid. It may be further purified by crystallizing from warm water.

The product is a white solid, soluble in most alkalies such as sodium hydroxide, somewhat soluble in cold water but much more soluble in hot water. It is but slightly soluble in alcohol.

The sodium salt of 3-amino-4-beta-hydroxyethyl-amino-phenylarsonic acid is prepared from the acid in the following manner.

The monosodium salt of 3-amino-4-beta-hydroxyethylaminophenylarsonic acid may be prepared quite readily by dissolving the acid in a 25% solution of sodium hydroxide containing one molecular equivalent of sodium hydroxide, warming on a water bath until all is dissolved and then cooling, whereupon the sodium salt separates in the form of white crystals. It is very soluble in cold water. Corresponding salts of other metals, such as potassium, the alkaline earths, etc. may be prepared in a similar manner.

*Example II.—3-amino-4-gamma-hydroxypropylaminophenylarsonic acid.*

We will first describe the production of the first intermediate gamma chloropropyl-(4-arsono-2-nitro-phenyl)-carbamate.

105 grams of gamma-chloro-propyl-(p-arsonophenyl)-carbamate (Rodewald and Adams; J. Am. Chem. Soc., 45, 3103, Dec. 1923) is slowly added with constant stirring to 261 c. c. of concentrated sulfuric acid, keeping the temperature between 0 and 10° C. by cooling. When all is dissolved, a cold mixture of 20.0 c. c. of nitric acid (sp. gr. 1.42) and 25.3 c. c. of concentrated sulfuric acid is added drop by drop with stirring, keeping the temperature between 0 and 5° C. After all has been added, stirring is continued for ½ hour during which the temperature is allowed to increase to 15° C.

The reaction mixture is then added to a mixture of 800 grams ice and 625 c. c. water. A light colored solid separates. After standing for several hours, it is filtered, washed several times with water and dried. In order to purify it, the product is boiled with 95% alcohol in which it is insoluble but in which impurities are readily soluble. The product, gamma-chloro-propyl-(4-arsono-2-nitro-phenyl)-carbamate, is thus obtained in an almost quantitative yield.

We will now describe the preparation of the second intermediate—3-nitro-4-gamma-hydroxypropylaminophenylarsonic acid.

234 grams of gamma-chloropropyl-(4-arsono-2-nitrophenyl)-carbamate is dissolved in a solution of 119 grams of sodium hydroxide in 1190 c. c. of water. The solution is refluxed gently for four hours. It is then filtered from any insoluble impurities while hot and concentrated hydrochloric acid is then added to the filtrate until the mixture is just acid to congo. A copious yellow precipitate of 3-nitro-4-gamma-hydroxypropylaminophenylarsonic acid is obtained. After cooling thoroughly, the product is filtered off. It may be purified by crystallizing from hot water from which it separates in the form of yellow needle crystals.

The desired acid may now be prepared from the second intermediate in the following manner:

100 grams of 3-nitro-4-gamma-hydroxypropylaminophenylarsonic acid is dissolved in 624 c. c. of normal sodium hydroxide solution and the solution is cooled to −2° C. Then 210 grams of powdered sodium hydrosulfite is quickly added with vigorous stirring. The temperature rises to about 30° C. and the solution is then cooled to 25° C. as quickly as possible. It is allowed to stand for two hours and then 50.4 c. c. of concentrated hydrochloric acid is added whereupon a white precipitate slowly forms. The mixture is cooled thoroughly, allowed to stand several hours and is then filtered. The product, 3-amino-4-gamma-hydroxypropyl-aminophenylarsonic acid, may be purified by dissolving in a sodium hydroxide solution, filtering and reprecipitating with glacial acetic acid. It may be further purified by crystallizing from warm water.

The product is a white solid, soluble in most alkalies such as sodium hydroxide and somewhat soluble in cold water but more soluble in hot water. In contrast to the ethyl derivative, it is readily soluble in alcohol.

The sodium salt of 3-amino-4-gamma-hydroxypropylaminophenylarsonic acid may be prepared in the same manner as that of the corresponding ethyl compound. It has similar physical properties.

It is understood that we do not wish to limit ourselves to the exact conditions and amounts set forth in the above examples.

We claim as our invention:

1. As a new article of manufacture, a 3-amino-4-omega-hydroxyalkylaminophenylarsonic acid or derivative having the general formula

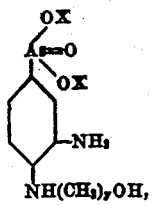

in which X represents hydrogen or a metal, and $y$ represents two or more.

2. As a new article of manufacture, a 3-amino-4-beta-hydroxyethylaminophenylarsonic acid or derivative having the general formula

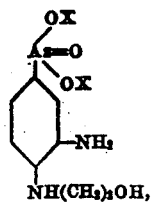

in which X represents hydrogen or a metal.

3. As a new article of manufacture, a salt of 3-amino-4-beta-hydroxyethylaminophenylarsonic acid.

4. As a new article of manufacture, the monosodium salt of 3-amino-4-beta-hydroxyethylaminophenylarsonic acid, which is a white solid, readily soluble in water, but soluble with difficulty in most of the common organic solvents.

ELMER B. VLIET.
ERNEST H. VOLWILER.